United States Patent [19]

Moriarty

[11] Patent Number: 5,363,931
[45] Date of Patent: Nov. 15, 1994

[54] DRILLING STABILIZER

[75] Inventor: Keith A. Moriarty, Houston, Tex.

[73] Assignee: Schlumberger Technology Corporation, Houston, Tex.

[21] Appl. No.: 88,272

[22] Filed: Jul. 7, 1993

[51] Int. Cl.5 .................. E21B 17/10; F16L 21/00; F16L 25/04

[52] U.S. Cl. ............... 175/325.5; 166/241.7; 285/404

[58] Field of Search ............ 175/325.5, 325.6, 325.7; 166/241.7, 173; 285/404

[56] References Cited

U.S. PATENT DOCUMENTS

| | | | |
|---|---|---|---|
| 1,446,789 | 2/1923 | Dodd | 285/404 X |
| 2,455,180 | 11/1948 | Kennedy | 285/404 |
| 2,758,891 | 8/1956 | Kammerer . | |
| 2,813,697 | 11/1957 | Swart . | |
| 3,164,216 | 1/1965 | Hall, Sr. et al. . | |
| 3,285,678 | 11/1966 | Garrett et al. . | |
| 3,292,708 | 12/1966 | Mundt . | |
| 3,329,212 | 7/1967 | Pourchot . | |
| 3,370,894 | 2/1968 | Pourchot . | |
| 3,397,017 | 8/1968 | Grant et al. . | |
| 3,410,613 | 11/1968 | Kuus . | |
| 3,420,323 | 1/1969 | Owens . | |
| 3,482,889 | 12/1969 | Cochran | 175/325.5 |
| 3,528,499 | 9/1970 | Collett . | |
| 3,560,060 | 2/1971 | Morris . | |
| 3,709,569 | 1/1973 | Napper . | |
| 3,894,779 | 7/1975 | Hoon et al. . | |
| 3,894,780 | 7/1975 | Broussard . | |
| 3,916,998 | 11/1975 | Bass, Jr. et al. . | |
| 3,933,203 | 1/1976 | Evans . | |
| 3,938,853 | 2/1976 | Jurgens et al. . | |
| 3,945,446 | 3/1976 | Ostertag et al. . | |
| 4,011,918 | 3/1977 | Jurgens . | |
| 4,036,539 | 7/1977 | Saunders et al. . | |
| 4,042,023 | 8/1977 | Fox . | |
| 4,124,231 | 11/1978 | Ahlstone | 285/404 X |
| 4,266,578 | 5/1981 | Swain et al. . | |
| 4,275,935 | 6/1981 | Thompson et al. . | |
| 4,345,785 | 8/1982 | Bradford | 285/404 X |
| 4,819,974 | 4/1989 | Zeidler | 285/404 X |
| 4,984,633 | 1/1991 | Langer et al. | 175/325.5 X |

FOREIGN PATENT DOCUMENTS

| | | |
|---|---|---|
| 1372181 | 10/1974 | United Kingdom . |
| 2171436 | 8/1986 | United Kingdom ............. 175/325.5 |

*Primary Examiner*—Stephen J. Novosad
*Attorney, Agent, or Firm*—David L. Moseley; Wayne I. Kanak

[57] ABSTRACT

A stabilizer to be mounted on a collar of a well drilling string including a circumferentially continuous tubular body having several outwardly extending blades thereon, the tubular body having an inner dimension such that it can be slid onto a drill collar, and radially energized components which positively fix the stabilizer on the collar including dies mounted in the blades, and having serrations on their inner faces, and drive elements to cause the serrations to bite into the collar and thereby fix the stabilizer thereon in a selected longitudinal and rotational position.

17 Claims, 4 Drawing Sheets

DRILLING STABILIZER

BACKGROUND OF THE INVENTION

1. Field of the Invention

This invention relates generally to a stabilizer apparatus for logging-while-drilling ("LWD") or measurement-while-drilling ("MWD") applications, and particularly to a stabilizer including a plurality of outwardly extending blades on a tubular body that can be mounted to a standard drill collar and rigidly secured at a selected longitudinal and rotational position thereon.

2. Description of the Related Art

Stabilizers are used in a drill string primarily for the purpose of providing a predetermined radial spacing of the longitudinal axis of the drill string with respect to the borehole wall. A stabilizer can be either full-gauge so that the outer diameter of its blades is substantially the same as the gauge diameter of the bit, or somewhat under-gauge so that the outer diameter of its blades is less than the gauge diameter of the bit. The use of various combinations of full and/or under-gauge stabilizers, and the longitudinal spacing thereof along the drill string above the bit, is one of various methods which can be used to control the direction the borehole takes during drilling.

In many instances it is desirable to mount a stabilizer on a "slick" drill collar, that is a drill collar having no special machining on its outside where the stabilizer is to be located. Such machining greatly increases the cost of the collar, reduces its versatility, and can substantially increase fishing and wash-over costs to the operator under circumstances mentioned below. Moreover, in highly deviated or horizontal wells a non-slick collar provides more drag and less weight-on-bit, which are other important disadvantages. In a principle aspect, the present invention is directed toward the provision of a stabilizer that can be slidably mounted on and rigidly attached to a slick drill collar in order to obviate the various disadvantages noted above.

Where a stabilizer is used in association with a logging-while-drilling (LWD) or a measurement-while-drilling (MWD) tool, it often is desirable to locate one or more transducers that operate to measure a characteristic property of the earth formations which have been penetrated by the bit within or underneath the blades of the stabilizer. The primary purpose of such location is to provide a physical contact between the transducer and the earth formation. This causes the drilling mud to be temporarily displaced by the stabilizer blades to provide a measurement environment that is substantially free of borehole effects which otherwise can have an adverse impact on the quality of the measurement. Such borehole effects include the standoff between the tool and the earth formations, and drilling mud and mudcake located between the tool and the earth formations. In some applications, it is also desirable to locate the transducers as close to the bit as possible so that measurements can be made before mud filtrate has invaded the formation and before a substantial mudcake has built up on the borehole walls.

Examples of measurements that can be made while drilling are the density and porosity of the formation such as disclosed in U.S. Pat. Nos. 4,814,609 and 4,879,463, which are assigned to the assignee hereof and hereby incorporated herein by reference. For example in the measurement of formation density, a plurality of apertures filled with gamma-ray transparent plugs or windows are preferably provided in the outer body of the tool in registration with the source and detectors. In order to minimize the borehole effects described earlier herein, the source and detectors are preferably housed underneath a stabilizer having similar apertures filled with gamma-ray transparent plugs that are in registration with the tubular body apertures and the source/detectors behind them. As will be appreciated by those skilled in the art, controlling and maintaining the shape, size, spacing, and alignment of these apertures with respect to the underlying tool components (e.g. nuclear sources, detectors, electronics, etc.) can be critical in obtaining accurate and reliable measurements. Where recovery of stuck drill collars is attempted by fishing and washover operations noted above, the costs thereof may be drastically reduced where a slick drill collar is being used. Additionally, the full range of fishing, washover and milling operations is made possible by prior removal of any nuclear logging sources present in the MWD or LWD tools in the bottom hole assembly by methods disclosed in commonly assigned U.S. Pat. Nos. 4,814,609 and 5,184,692 which are incorporated herein by references.

Another downhole formation measurement that can be made with an LWD tool is electrical resistivity or its reciprocal, conductivity. In commonly-assigned U.S. Pat. application No. 07/786,137 filed Oct. 31, 1991 and incorporated herein by reference, a preferred embodiment of the LWD tool measures formation resistivity by employing a current emitting electrode and one or more current receiving electrodes mounted on a stabilizer. Since the current is emitted and received through spaced openings in the blade, again the axial and rotational alignment of the blade with respect to the electronics and wiring contained in the underlying LWD tool is of extreme importance. Unless such alignment is maintained in the borehole during drilling, the measurements can be severely attenuated, if not disrupted altogether.

A stabilizer assembly that with some modification has been used in LWD operations is disclosed in U.S. Pat. No. 4,275,935 issued Jun. 30, 1981 to Charles M. Thompson et al. and entitled "Drilling Stabilizer". The stabilizer includes a sleeve having blades and is longitudinally split along one of its blades so that it can be slipped onto a drill collar. Then a plurality of bolts are placed in holes through the split blade, and are tightened to reduce the inner diameter of the stabilizer and thus obtain a friction fit around the collar. However, since this stabilizer is not circumferentially continuous, the bolts, which are highly stressed, tend to fatigue after a limited number of cycles. Additionally, the sensitivity of the friction fit to the condition of the drill collar can reduce the holding capability of this stabilizer and result in movement of the stabilizer with respect to the collar.

U.S. Pat. No. 3,164,216 discloses a drill pipe protector having hinged halves that encircle the drill string and are pinned in place. Radial screws which engage metal tabs that pinch inward against an internal rubber sleeve are used to hold the protectors in place. However, it is believed that in a real drilling environment a rubber sleeve may not be sturdy enough to adequately prevent movement of a stabilizer for MWD and LWD applications, particularly under conditions of higher down hole temperatures, no matter how much it is pinched. U.S. Pat. No. 2,813,697 also discloses a stabilizer having screws which go through overlapping tongues in a metal sleeve which holds an elastomer stabilizer around a reduced diameter section of a drill collar. These screws are merely for assembly and disassembly purposes and the stabilizer is held by shoulders formed on the collar.

Other patents such as U.S. Pat. Nos. 4,101,179 and 3,916,998 show stabilizers that have conical surfaces which cause one or more movable members to frictionally engage the outer surface of a drill collar. However, mere frictional engagement of a small ring, particularly over a small area, may be insufficient to hold the stabilizer in position for MWD and LWD applications. U.S. Pat. Nos. 4,011,918, 3,945,446 and 3,938,853 relate to "shrink-fit" stabilizers which require machining of accurate conical surfaces, as well as complicated and expensive hydraulic equipment that is used to attain the shrink fit. Each of these devices has drawbacks which are eliminated by the present invention.

A general object of the present invention is to provide a new and improved stabilizer that can be positioned on a drill collar and attached thereto in a manner which obviates the disadvantages noted above.

Another object of the present invention is to provide a new and improved stabilizer that can be positioned on a slick drill collar and has radially energized dies that grip outer surfaces of the drill collar to positively attach the stabilizer thereto.

Still another object of the present invention is to provide a new and improved stabilizer of the type described which can be secured on a drill collar or other tubular housing at a precise longitudinal and rotational position in order to cooperate with various sources and detectors that may be found on an LWD or MWD tool.

SUMMARY OF THE INVENTION

These and other objects are attained in accordance with the concepts of the present invention through the provision of a stabilizer apparatus comprising a circumferentially continuous, generally tubular body member having an internal bore that is sized to slide onto a standard drill collar and which has a plurality of circumferentially spaced, outward extending blades or fibs formed thereon. Once the desired longitudinal and rotational position of the sleeve member on the collar has been established, a plurality of dies which preferably are located in each of the blades are operated by threaded drive plugs to load the sleeve member against the outer surfaces of the drill collar and thus attach the stabilizer thereto. The dies have serrations or teeth on their inner faces which penetrate outer surfaces of the underlying drill collar material to provide rigid attachment. To ensure that the dies do not loosen under downhole vibration and shock, a screw is threaded into each die and holds the drive plug tightly thereagainst to prevent loosening thereof. In an alternative embodiment of the present invention, loosening of the dies is prevented by spring pins that engage transverse holes in the drive plugs and corresponding holes in the stabilizer to prevent rotation of the drive plugs.

A predetermined number of dies will provide the equivalent, or a greater, holding force than the prior devices. The invention has various advantages including the fact that no splits in the stabilizer body are present which compromise its mechanical integrity, no highly stressed expensive bolts with limited fatigue life are used, and the surface condition, finish, and coefficient of friction of the collar are not factors of any particular importance. Moreover, no cumbersome torque collars need be used which limit mud flow and cause higher annulus flow velocities to exist.

In accordance with another aspect of the present invention, a secondary holding force can be provided by a generally cylindrical lug or pin that fits into a recess in the drill collar. The pin extends across the interface between the collar and the stabilizer sleeve member, and is held in place by a snap ring. A transverse groove around the pin provides a weakened region. This connecting mechanism can be used where high loads are expected downhole in the nature of operations involving jarring, high torque and the like. Such pin or pin assembly will shear at extremely high loads, however the structural integrity of the drill collar is not jeopardized. A combination of die and pin assemblies can be used such that the dies provide the primary holding force during normal operating conditions, and the pins provide additional resistance to movement under extreme conditions.

BRIEF DESCRIPTION OF THE DRAWINGS

The present invention has other objects, features and advantages that will become more clearly apparent in connection with the following detailed description of preferred embodiments, taken in conjunction with the appended drawings in which.

DESCRIPTION OF PREFERRED EMBODIMENT

Figure 1:
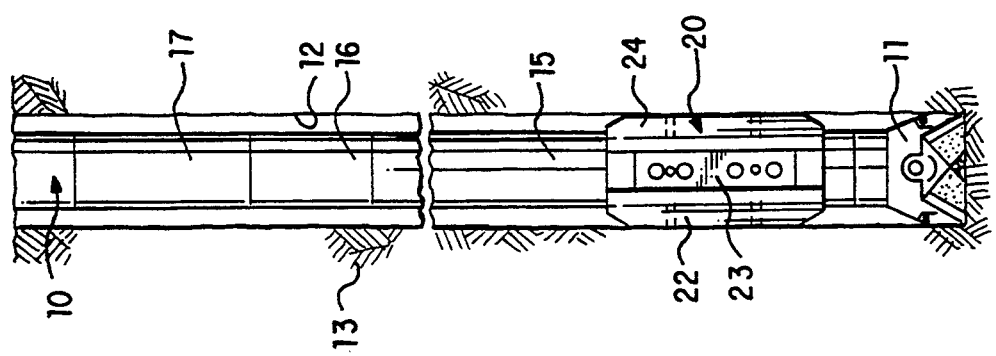
FIG. 1 is a schematic view of an LWD operation which employs a stabilizer apparatus that is constructed in accordance with the present invention.

Referring initially to FIG. 1, a drill string indicated generally at 10 has a bit 11 connected to its lower end which drills a borehole 12 through earth formations 13 as the drill string and bit are rotated. The drill string 10 typically includes a length of relatively heavy drill collars at its lower end which provide weight on the bit 11, and the collars are suspended on smaller diameter and less heavy drill pipe (not shown) that extends upward to the surface. The drill collar string can include an instrumented sub or LWD tool 15 that is located above the bit 11. The LWD tool 15 is used to measure one or more characteristic properties of the earth formations 13 that are penetrated by the borehole 12. Although numerous measurements can be made by LWD tool 15, measurements of formation density, formation porosity, and electrical resistivity/conductivity are particularly useful.

Signals representative of the measurements made by LWD tool 15 are typically either stored downhole in memory for later retrieval at the surface, or fed to a controller 16 which controls the operation of a transmitter 17 that signals the data uphole through the column of drilling mud inside the drill string 10 to where it is detected at the surface. The detected signals are then processed and recorded to provide a log of the particular characteristic property versus depth of the borehole as the drilling proceeds.

A stabilizer apparatus which is made in accordance with the present invention is indicated generally at 20 and is shown as being mounted on the instrumented LWD tool collar 15, although it could be mounted on another collar in the string. As illustrated in further detail in FIGS. 2 and 3, the stabilizer 20 includes an elongated sleeve 21 having a plurality of outwardly directed blades 22, 23, 24, 25 formed integrally therewith. Each blade 22-25 has oppositely inclined surfaces 26, 27 at its respective upper and lower ends, and a hard-facing material 29 can be employed on the arcuate outer face of each blade to reduce wear. The sleeve 21 has been slipped over the LWD tool collar 15 which comprises the measurement tool, and after being positioned both longitudinally and rotationally in a desired location thereon, has been fixed thereto by a plurality of anchoring mechanisms 19, one of which is shown in enlarged detail in FIG. 4.

Figure 4:
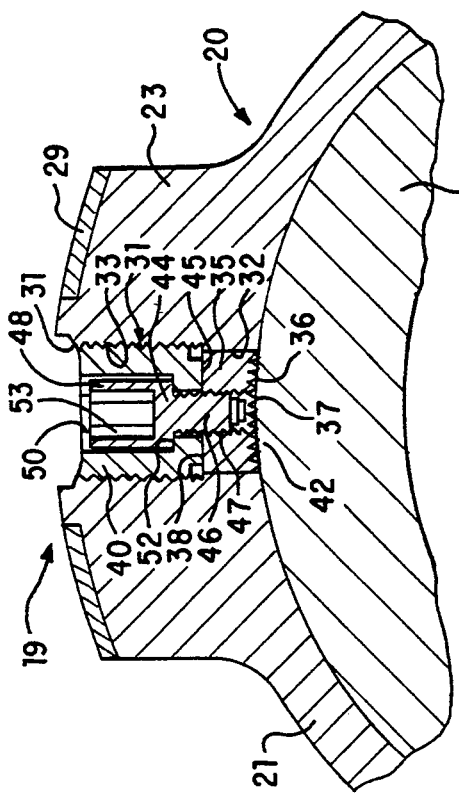
FIG. 4 is a partial, enlarged cross-section view of a radially energized die assembly taken on line 4—4 of FIG. 2.

As shown in FIG. 4, a number of radial holes 31 are formed in the lateral center of each blade 22-25, for example two holes with one of them being located adjacent each inclined end portion of a blade. Each hole 31 has a reduced diameter inner bore 32 and an enlarged diameter counterbore 33 which is threaded to provide an axial cam as shown. The bore 32 receives a ring-shaped die 35 having pointed serrations or teeth 36 formed on its curved inner face 37. The outer face 38 of the die 35 is planar. A threaded drive plug 40 is screwed into the counterbore 33 and has an inner surface 45 which abuts the outer face 38 of the die 35. The plug 40 has a hexagonal recess 50 in its outer end, or other suitable means which allows it to be threaded inward by a suitable tool. When the plug 40 is tightened, the serrations 36 are embedded in the outer surface 42 of the collar 15 to anchor the stabilizer 20 against longitudinal or rotational movement relative thereto.

A secondary lock screw 44 is provided to ensure that the drive plug 40 does not loosen under vibration and shock loads downhole. The screw 44 has a threaded shank 46 which screws into a threaded bore 47 in the center of the die 35. The head 48 of the screw 44 is received in the recess 50 of the plug 40, and bears against the bottom surface 52 thereof in order to force the opposing faces of the die 35 and plug 40 tightly against one another. With this arrangement the drive plug 40 cannot loosen because its turning also is inhibited by the serrations 36. The screw 44 can have a square, hexagonal or other standard recess 53 in its head 48 so that it can be turned by a typical hand tool.

Figure 2:
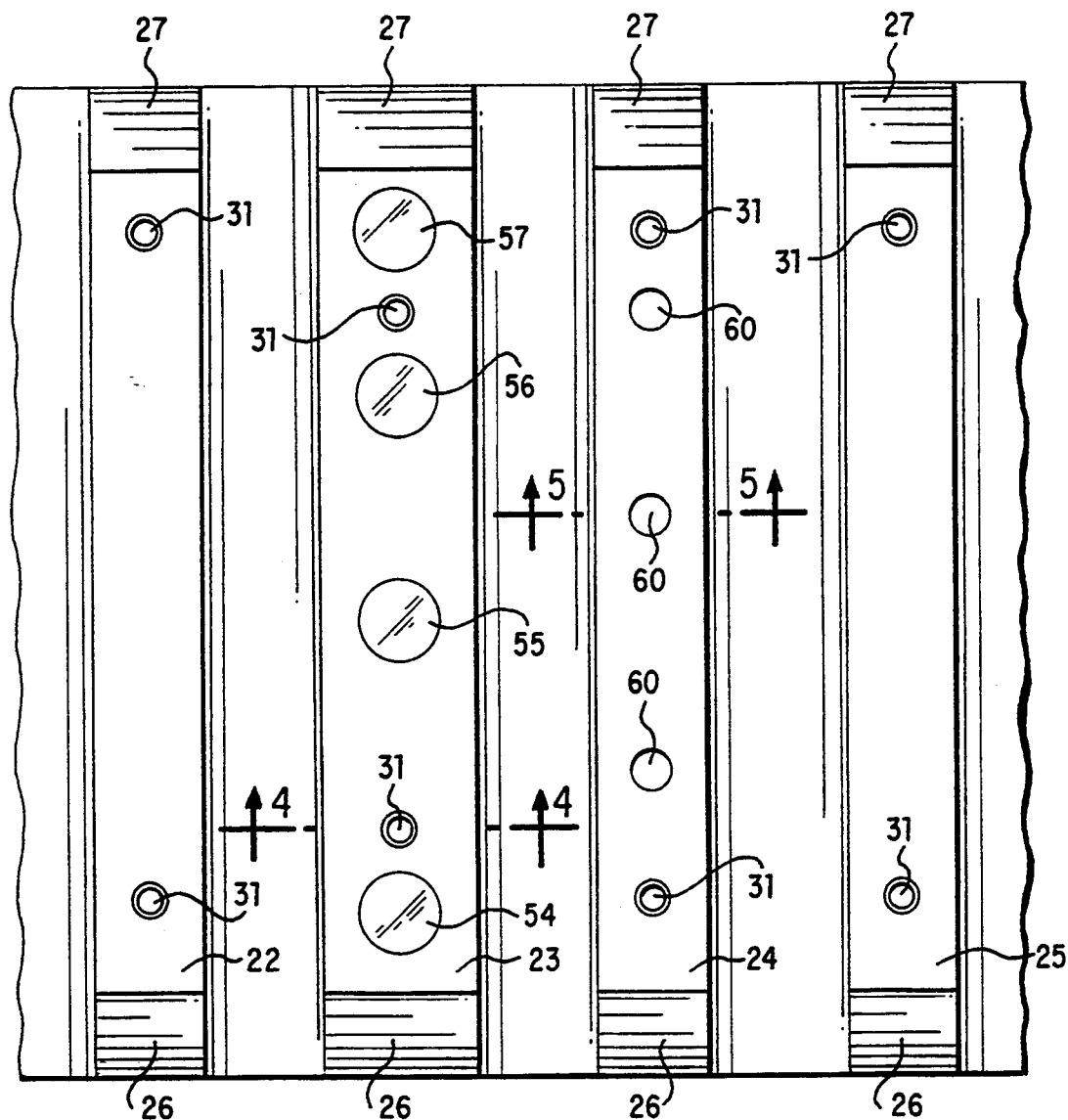
FIG. 2 is an expanded plan view of the stabilizer of FIG. 1.
Figure 3:
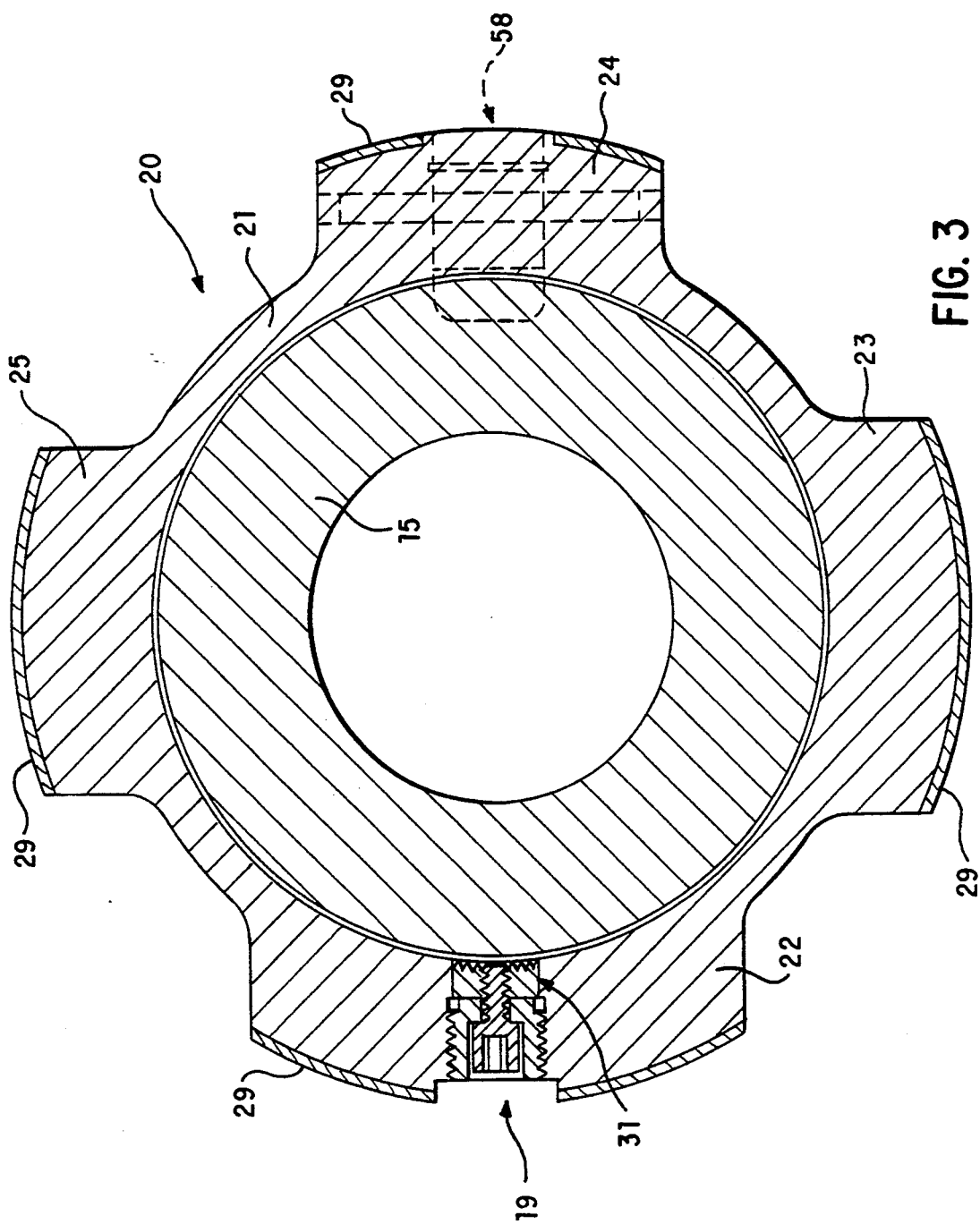
FIG. 3 is a cross-sectional view of the stabilizer mounted on a drill collar.

The anchoring mechanisms 19 shown in FIG. 4 are positioned in each of the holes 31 shown in FIG. 2 so that preferably there are a total of eight such mechanisms, two on each of the blades 22-25. Where downhole drilling conditions are expected which may cause severe shock and vibration problems, additional locking mechanisms indicated generally at 58 in FIG. 5 can be mounted in holes 60 in the blade 24 as shown generally in FIG. 2, and are used in combination with the anchoring mechanisms 19. Each of the mechanisms 58 includes a cylindrical plug or pin 61 having an inner portion 62 and an outer portion 63. The inner walls 64 of the portion 62 are rounded as shown, and such inner portion fits into a mating recess 65 in the collar 15. The outer portion 63 of the plug 61 is joined to the inner portion 62 by a section 66 of reduced cross-sectional area to provide a weakened region when subjected to shear forces, such weakened region being located at approximately the interface between the outer surface of the collar 15 and the inner wall of the sleeve 21. A typical retainer ring 67 is positioned in a groove 68 to hold the plug 61 in place. Additionally, a spring or roll pin 102 is driven into a transverse hole 104 in the blade 24 and through an aligned hole 103 in the plug 61 to provide further assurance that the plug will be held in place under the shock and vibration conditions which are encountered downhole. The spring pin 102 is compressed as it is driven into an interference fit in the hole 104, thereby ensuring that the pin 102 is firmly retained in the hole 104. On account of the cross-sectional area of the weakened section 66, the pin or plug 61 is designed to shear at an extremely high load, but not so high that the integrity of the tool collar 15 is jeopardized in case the stabilizer hangs up or sticks in the hole.

Figure 6:
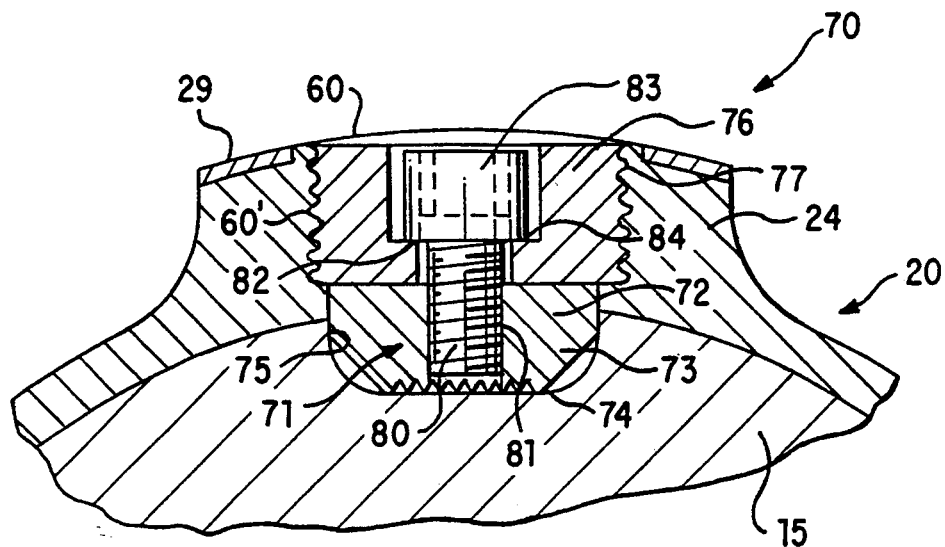
FIG. 6 is an enlarged cross-section view of another embodiment of a locking pin.

Another locking mechanism in accordance with this invention is shown generally at 70 in FIG. 6. The mechanism 70 has certain characteristics in common with each of the mechanisms 19 and 58, and is mounted in a hole 60. In this example a pin 71 having a cylindrical upper portion 72 and a frusto-conical lower portion 73 is provided with serrations 74 on its lower face. The pin 71 fits into a mating recess 75 in the collar 15, and is driven into such recess by an axial cam such as threads 77 on the outer periphery of a drive nut 76 which engage companion threads 60' of the inner wall of a hole 60 in the stabilizer blade 24. After the serrations 74 have been embedded in the collar material by tightening the drive nut 76 by a suitable hand tool, the threads 80 on locking screw 83 are engaged with matching threads 81 in the pin 71 and the locking screw 83 is tightened with a suitable tool to force the lower surface 82 of the screw 83 against the upper face 84 of the nut 76. Thus the serrations 74 also prevent the nut 76 from turning loose. In this embodiment the shear forces at the interface between the collar 15 and the stabilizer 20 are applied across the full cross-sectional area of the upper portion 72 of the pin 71 to provide sufficient strength to maintain accurate positioning of the stabilizer 20 with respect to the collar 15, particularly where three of these mechanisms are used as shown in FIG. 2 at holes 60.

Figure 7:
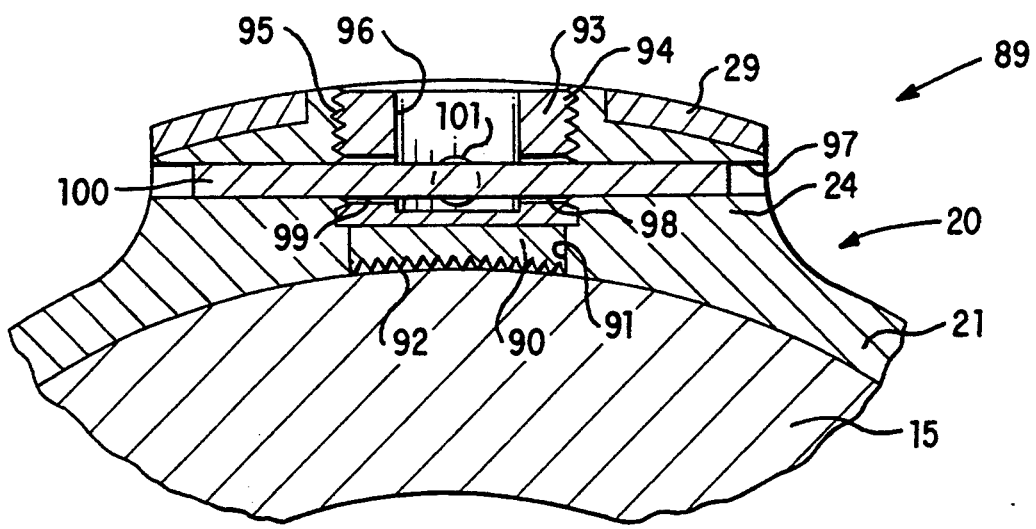
FIG. 7 is an enlarged cross-section view of an alternative embodiment of a radially energized die assembly.

Another alternative embodiment 89 of the present invention is illustrated in FIG. 7. As in the embodiment shown in FIG. 4, a die member 90 that fits in a hole 91 in a blade 24 has serrations 92 on its inner face which bite into outer surfaces of the collar 15 when driven inward by a drive plug 93 which has threads 94 that mesh with threads 95 on the blade. The drive plug 93 has either a square, hexagonal or other standard recess 96 therein which enables a suitable hand tool to be used to tighten or loosen it. To prevent loosening of the drive plug 93, a transverse hole 97 is drilled through the blade 24 which registers with transverse holes 98, 99 which are formed in the drive plug in a manner such that they extend at a right angle to opposed side surfaces of the recess 96. A spring or roll pin 100 is driven into the holes 97-99 and provides a resistive shear force that prevents rotation and loosening of the drive plug 93 relative to the stabilizer blade 24. The spring pin 100 is compressed as it is driven into an interference fit in the hole 97, thereby generating frictional force which holds the pin 100 in the hole 97. Another set of holes 101 (shown partly in phantom lines) in the drive plug 93 are provided for alignment with the transverse hole 97 after an additional 90° of plug rotation to assure that the plug is fully tightened before the pin 100 is driven.

The larger holes 54-57 in the blade 23 as shown in FIG. 2 are filled with a suitable radiation transparent material and provide measurement windows which are used in connection with density logging where a source emits neutrons into the formations which interact with the atoms of the rock to produce a back-scatter of other reaction particles, such as gamma rays. The count of gamma rays is detected by sensors located underneath the holes 55, 56 for example, so that investigations of density at different depths are made. Where such measurements are being made, rotation and longitudinal alignment of the holes 54-57 with underlying recesses in the collar is crucial. Additionally, resistivity or sonic type measurements are also possible through measurement windows of the type described.

OPERATION

In operation and use, the stabilizer 20 with the radial holes 31, 60 and 54-57 machined in the blades as shown in the drawings is slipped onto the end of a collar 15 and slid therealong to a desired location. If rotational alignment is needed, this also is accomplished. In the case of the anchoring mechanisms shown in FIG. 4, the dies 35 and the drive plugs 40 are positioned in the holes 31, and the plugs 40 are rotated by a tool to a predetermined torque which embeds the serrations 36 of the dies in the underlying metal of the collar 15. As shown in FIG. 2, a total of eight dies and plugs can be used, with a pair in each blade. The lock screws 44 then are inserted into the drive plugs 40 and threaded into the central bores 47 of the dies 35. Each screw 44 then is tightened with a tool to a torque setting which will prevent releasing rotation of the associated drive plug 40. Preferably a thread locking compound such as "LOCTITE" is used where the various threads are made up.

Figure 5:
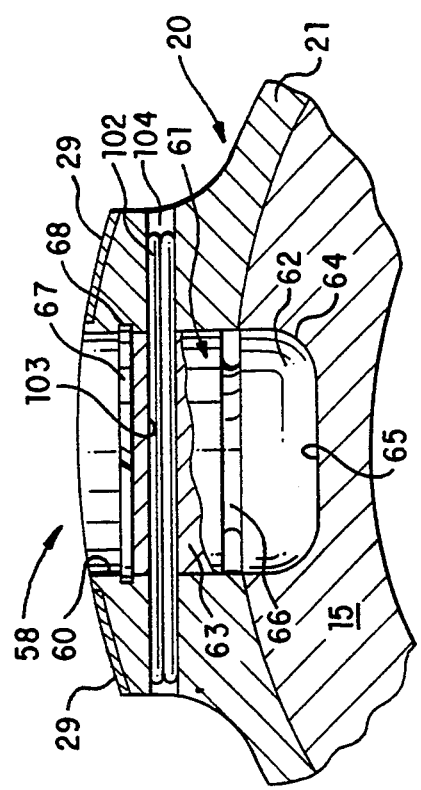
FIG. 5 is a view similar to FIG. 4 of a locking pin assembly taken on line 5—5 of FIG. 2.

When the pin-type locking mechanisms 58 shown in FIG. 5 are used in combination, the pins 61 are inserted into the holes 60 so that their inner portions 62 are fully seated in the cylindrical recesses 65 in the collar 15. The retaining rings 67 then are installed in the grooves 68. The locking mechanisms 58 provide precise rotational and longitudinal placement of the stabilizer 20 so that the measurement windows 54-57 are radially aligned with underlying recesses in the collar 15, and provide secondary holding forces when very high loads are encountered downhole. The weakened sections 66 are designed to shear at extremely high loads. The mechanisms 19 and 58 function in combination so that the dies 35 provide primary holding force during normal operative conditions, and the pins 61 provide secondary resistance to relative movement only under extreme downhole conditions.

The locking mechanism 70 shown in FIG. 6 operates in a manner similar to each previous embodiment in that it includes a pin 71 which seats in a recess 75 like the embodiment shown in FIG. 5, but has serrations 74 which prevent turning of the pin. A threaded drive nut 76 is used to set the serrations 74 into the metal at the bottom of the recess 75, and a locking screw 83 is employed to prevent the threads 77 from releasing in response to vibration and other forces. Of course the pin 71 does not have a weakened section as does the pin shown in FIG. 5, so that its full cross-sectional area and the area of the locking screw 83 resists shearing in use. The embodiment shown in FIG. 7 operates much like the one shown in FIG. 4 except that a spring pin 100 is employed to prevent releasing rotation of the drive plug 93.

It now will be recognized that a new and improved stabilizer has been provided having locking mechanisms by which it can be mounted on a slick drill collar. Such stabilizer meets all the objectives of the present invention, and eliminates the various disadvantages in the patented devices noted above. Certain changes or modifications may be made in the disclosed embodiment without departing from the inventive concepts involved. For example the locking or anchoring mechanism of the present invention could be positioned in holes in the body of the stabilizer instead of in its blades. Thus it is the aim of the appended claims to cover all such changes and modifications falling within the true spirit and scope of the present invention.

What is claimed is:

1. A stabilizer adapted to be mounted on a drill collar, comprising: a circumferentially continuous tubular body member having a plurality of outwardly extending blades; and radially energized means on said stabilizer for gripping the drill collar to positively prevent movement of said stabilizer relative thereto, said radially energized means including inner and outer members, said inner member having means for biting into surfaces of the drill collar to grip the same, said outer member and body member having rotary cam means for causing inward radial movement of said inner member and operation of said biting means.

2. The stabilizer of claim 1 further including locking means engaging said inner and outer members for preventing loosening of said axial cam means.

3. The stabilizer of claim 2 wherein said inner member is a cylindrical pin which seats in a companion recess in the exterior of said drill collar.

4. The stabilizer of claim 1 further including locking means engaging said outer member and said blade for preventing loosening of said axial cam means.

5. The stabilizer of claim 2 wherein said inner member is a disc having an arcuate inner surface and a planar outer surface, said disc having a threaded bore engaged by said locking means.

6. The stabilizer of claim 1 wherein said biting means includes serrations.

7. A stabilizer adapted to be slidably positioned on a drill collar and then fixedly mounted thereon, comprising: a circumferentially continuous tubular body member having a plurality of outwardly extending, circumferentially spaced blades; a plurality of apertures in said blades, and radially energized means in at least some of said apertures for gripping the drill collar and preventing movement of said stabilizer relative thereto, said radially energized means including a die having inner and outer faces, serrations on said inner face, and a drive member adapted to engage said outer face and cause said serrations to bite into the collar.

8. The stabilizer of claim 7 further including a locking screw threaded to said die and engaging said drive member for tightening said die against said drive member.

9. The stabilizer of claim 7 wherein said radially energized means includes a pin having inner and outer faces and serrations on said inner face, cylindrical recess means in said collar for receiving said pin in a manner such that said serrations bite into said recess means; and drive means for forcing said pin into said recess means.

10. The stabilizer of claim 9 further including means for locking said drive means to said pin.

11. The stabilizer of claim 10 wherein said pin has a radial length that is greater than the radial depth of said recess so that the full cross-sectional area thereof extends across the interface between said body member and said collar.

12. A stabilizer adapted to be mounted on a drill collar, comprising: a circumferentially continuous tubular body member having a plurality of outwardly extending blades; and means for preventing rotation and longitudinal movement of said stabilizer relative to the drill collar including an aperture in one of said blades, recess means in the exterior of said collar radially aligned with said aperture, pin means engaging said aperture and said recess means, said pin means having a weakened section between its ends, and means for retaining said pin means in said aperture.

13. The stabilizer of claim 12 wherein said weakened section is provided by a reduced cross-sectional area of said pin means.

14. A stabilizer adapted to be slidably positioned on a drill collar and then fixedly mounted thereon, comprising: a circumferentially continuous tubular body having a plurality of outwardly extending, circumferentially spaced blades; radially energized means on at least some of said blades for gripping the drill collar to prevent movement of said stabilizer relative thereto; recess means in said collar underneath at least some of said blades; and means on at least some of said blades and cooperable with said recess means for providing additional prevention of longitudinal and rotational movement of said stabilizer relative to said collar.

15. The stabilizer of claim 14 wherein each of said radially energized means includes a die having serrations on the inner face thereof which bite into surfaces of said collar in response to inward force; and further including drive means adapted to force said dies inward to cause said serrations to bite into said surfaces.

16. The stabilizer of claim 14 further including means for locking said dies to said drive means.

17. The stabilizer of claim 1 further including radially aligned window means in said collar and in at least some of said blades for use in connection with measurement of a characteristic property of a formation.

* * * * *